US008565733B2

(12) United States Patent
Traasdahl

(10) Patent No.: US 8,565,733 B2
(45) Date of Patent: Oct. 22, 2013

(54) COMPUTER-BASED METHOD AND SYSTEM FOR PROCESSING A FILE REQUEST IN RESPONSE TO A MESSAGE RECEIVED FROM A USER MOBILE DEVICE

(75) Inventor: Are Traasdahl, New York, NY (US)

(73) Assignee: Clear Channel Management Services, Inc., San Antonio, TX (US)

( * ) Notice: Subject to any disclaimer, the term of this patent is extended or adjusted under 35 U.S.C. 154(b) by 1103 days.

(21) Appl. No.: 12/117,671

(22) Filed: May 8, 2008

(65) Prior Publication Data

US 2009/0280842 A1 Nov. 12, 2009

(51) Int. Cl.
*H04M 3/42* (2006.01)
(52) U.S. Cl.
USPC .................. 455/414.1; 455/414.2; 455/414.3
(58) Field of Classification Search
USPC .................................. 455/414.1–414.3, 466; 707/999.003–999.005, 999.01, 707/E17.108, E17.014
See application file for complete search history.

(56) References Cited

U.S. PATENT DOCUMENTS

| 6,397,246 | B1 * | 5/2002 | Wolfe ........................... 709/217 |
| 8,266,315 | B2 | 9/2012 | van Oldenborgh et al. |
| 8,316,146 | B2 | 11/2012 | Ehn et al. |
| 2003/0073433 | A1 * | 4/2003 | Djelogiry ...................... 455/426 |
| 2003/0211845 | A1 * | 11/2003 | Lohtia et al. ............... 455/414.3 |
| 2005/0187971 | A1 * | 8/2005 | Hassan et al. .............. 707/104.1 |
| 2007/0027857 | A1 * | 2/2007 | Deng et al. ....................... 707/3 |
| 2009/0192887 | A1 | 7/2009 | Moore et al. |
| 2009/0193134 | A1 | 7/2009 | Moore et al. |

FOREIGN PATENT DOCUMENTS

WO WO2011008188 A1 1/2011

* cited by examiner

*Primary Examiner* — Jinsong Hu
*Assistant Examiner* — Nathan Taylor
(74) *Attorney, Agent, or Firm* — Garlick & Markison; Edward J. Marshall

(57) ABSTRACT

The invention provides a computer-based method of transmitting a file, including receiving a message from a user mobile device at a service computer system, determining at the server computer system whether the message includes a search identifier, extracting at least one search result from a data store at the server computer system based on a search term in the message if the server computer system determined that the message included a search identifier, and transmitting a file corresponding to the search result from the server computer system to the user mobile device.

14 Claims, 12 Drawing Sheets

COMPUTER-BASED METHOD AND SYSTEM FOR PROCESSING A FILE REQUEST IN RESPONSE TO A MESSAGE RECEIVED FROM A USER MOBILE DEVICE

BACKGROUND OF THE INVENTION

1). Field of the Invention

This invention relates to a computer-based method and system for manipulating electronic media such as ringtones and videos.

2). Discussion of Related Art

Mobile phones usually have a number of ringtones that are installed by a manufacturer. A user can select a ringtone from a drop-down list, and it is also sometimes possible to associate different ringtones with different incoming phone numbers.

A user may wish to download a ringtone from a remote server and store the ringtone in memory of the mobile phone. However, a mobile phone and the network that it is connected to are usually too slow and the viewing capabilities on the mobile phone are too limited for finding media on a remote server. A company that provides mobile media content for use on mobile phones will usually also have a website that is accessible from a user computer system over the Internet. The user of the mobile phone may make use of the user computer system to find listings of mobile content on the website through browsing or searching functionality built into the website, and then instruct the website to facilitate downloading of the media content to the mobile phone. A message may, for example, be sent to the mobile phone, and the message can include a link to the media content on the server.

SUMMARY OF THE INVENTION

The invention provides a computer-based method of transmitting a file, including receiving a message from a user mobile device at a service computer system, determining at the server computer system whether the message includes a search identifier, extracting at least one search result from a data store at the server computer system based on a search term in the message if the server computer system determined that the message included a search identifier, and transmitting a file corresponding to the search result from the server computer system to the user mobile device.

The method may further include generating and transmitting a message from the server computer system to the user mobile device following the extraction of at least one search result, the message from the server computer system including a link for downloading the file, and receiving a download command from the user mobile device at the server computer system at least in part due to selection of the link at the user mobile device, the file being transmitted in response to receiving the download command.

The message from the user mobile device may include text, a first part of the text being the search identifier and a second part of the text being the search term.

The message from the server computer system may be an SMS message.

The selection of the link may open a browser on the user mobile device, and the method may include generating and transmitting a results page with the at least one search results from the server computer system to the mobile device, the results page being displayed by the browser.

A plurality of search results may be extracted based on the search term and are included in the results page, the search results being individually selectable utilizing the user mobile device, the download command being at least in part due to the individual selection of one of the search results.

The method may further include receiving a selection command from the user mobile device at the server computer system due to individual selection of one of the search results, and transmitting a download page from the server computer system to the user mobile device, the download page including a download selector that is selectable to transmit the download command.

The invention also provides a computer-readable medium having stored thereon a set of instructions that are executable by a processor of a computer to carry out a computer-based method of transmitting a file including receiving a message from a user mobile device at a service computer system, determining at the server computer system whether the message includes a search identifier, extracting at least one search result from a data store at the server computer system based on a search term in the message if the server computer system determined that the message included a search identifier, and transmitting a file corresponding to the search result from the server computer system to the user mobile device.

The invention further provides a server computer system including a message receiving module to receive a message from a user mobile device, a search identification module, connected to the message receiving module to determine whether the message includes a search identifier, at least one store holding a plurality of files and a plurality of entries corresponding to the files, an extraction module, connected to the search identification module and the at least one store, to extract at least one search term in the message if the search identification module determined that the message included a search identifier and a file transmissions module, connected to the extraction module, to transmit a file corresponding to the search result from the server computer system to the user mobile device.

BRIEF DESCRIPTION OF THE DRAWINGS

The invention is further described by way of example with reference to the accompanying drawings, wherein.

DETAILED DESCRIPTION OF THE INVENTION

Figure 1:
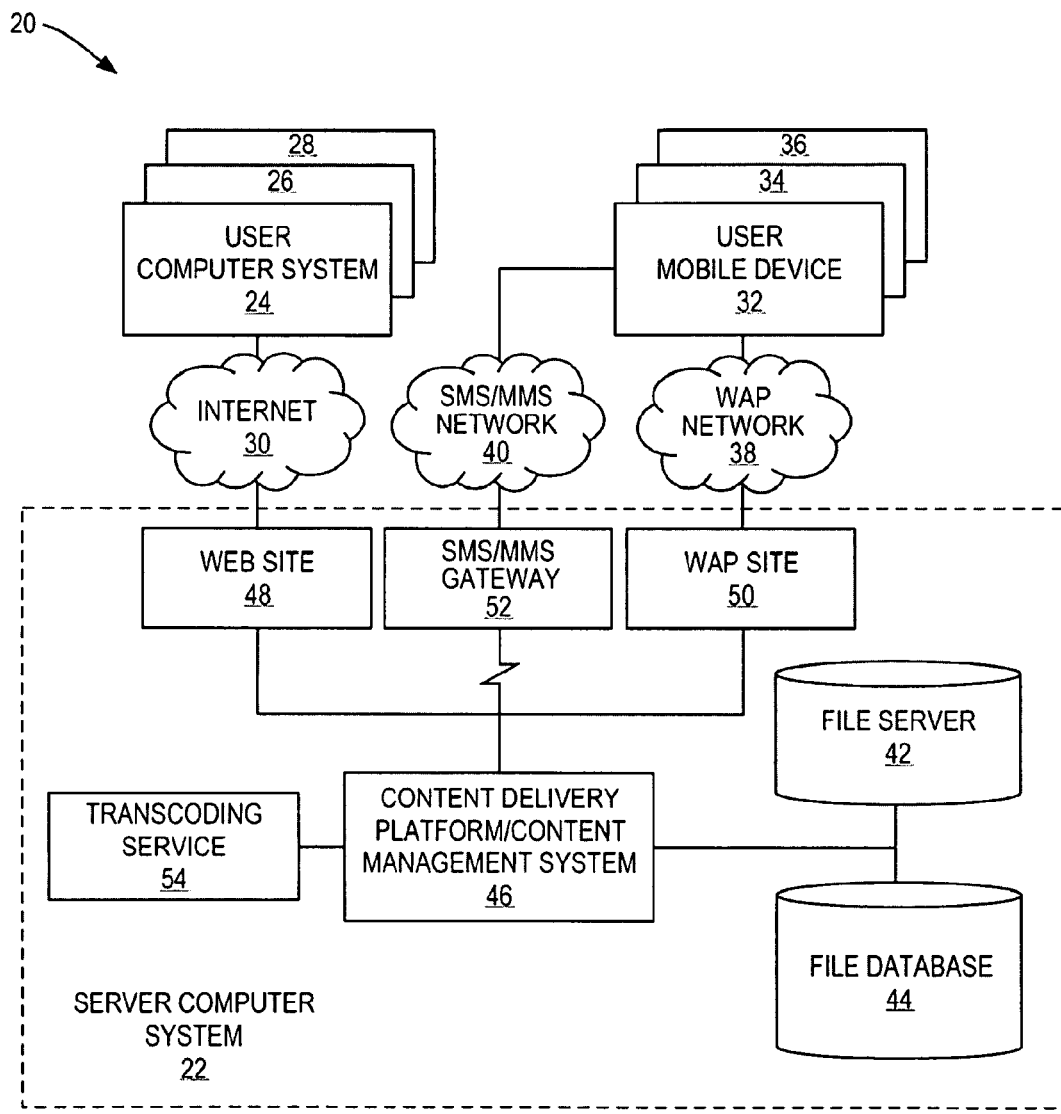
FIG. 1 is a block diagram of a network system in which aspects of the invention are manifested.

FIG. 1 of the accompanying drawings illustrates a network system 20 that embodies features of the invention. The network system 20 includes a server computer system 22, a plurality of user computer systems 24, 26, and 28 that are connected to the server computer system 22 over a network in the form of the Internet 30, and a plurality of user mobile devices 32, 34, and 36 that are connected over a Wide Application Protocol (WAP) network 38 and over a Short Message Service (SMS) and Multimedia Messaging Service (MMS) network 40 to the server computer system 22.

The server computer system 22 includes a file store in the form of a file server 42, a data store in the form of a file database 44, a content delivery platform and content management system 46, a Web site 48, a WAP site 50, an SMS/MMS gateway 52, and a transcoding service 54. The file database 44 is connected to the file server 42. The content delivery platform and content management system 46 forms the center of the server computer system 22, and all other components including the Web site 48, WAP site 50, SMS/MMS gateway 52, transcoding service 54, file server 42, and file database 44 are directly connected to the content delivery platform and content management system 46. The content delivery platform and content management system 46 indexes files such as ringtones (reduced media content), full-track content, games, wallpaper, and graphics from the file server 42 into the file database 44 and in a structured manner, as will be required for downloading and for the Web site 48, WAP 50, SMS/MMS gateway 52, and transcoding service 54. The transcoding service 54 prepares communications suitable for transmission over the Internet 30, WAP network 38, and SMS/MMS network 40.

Figure 2:
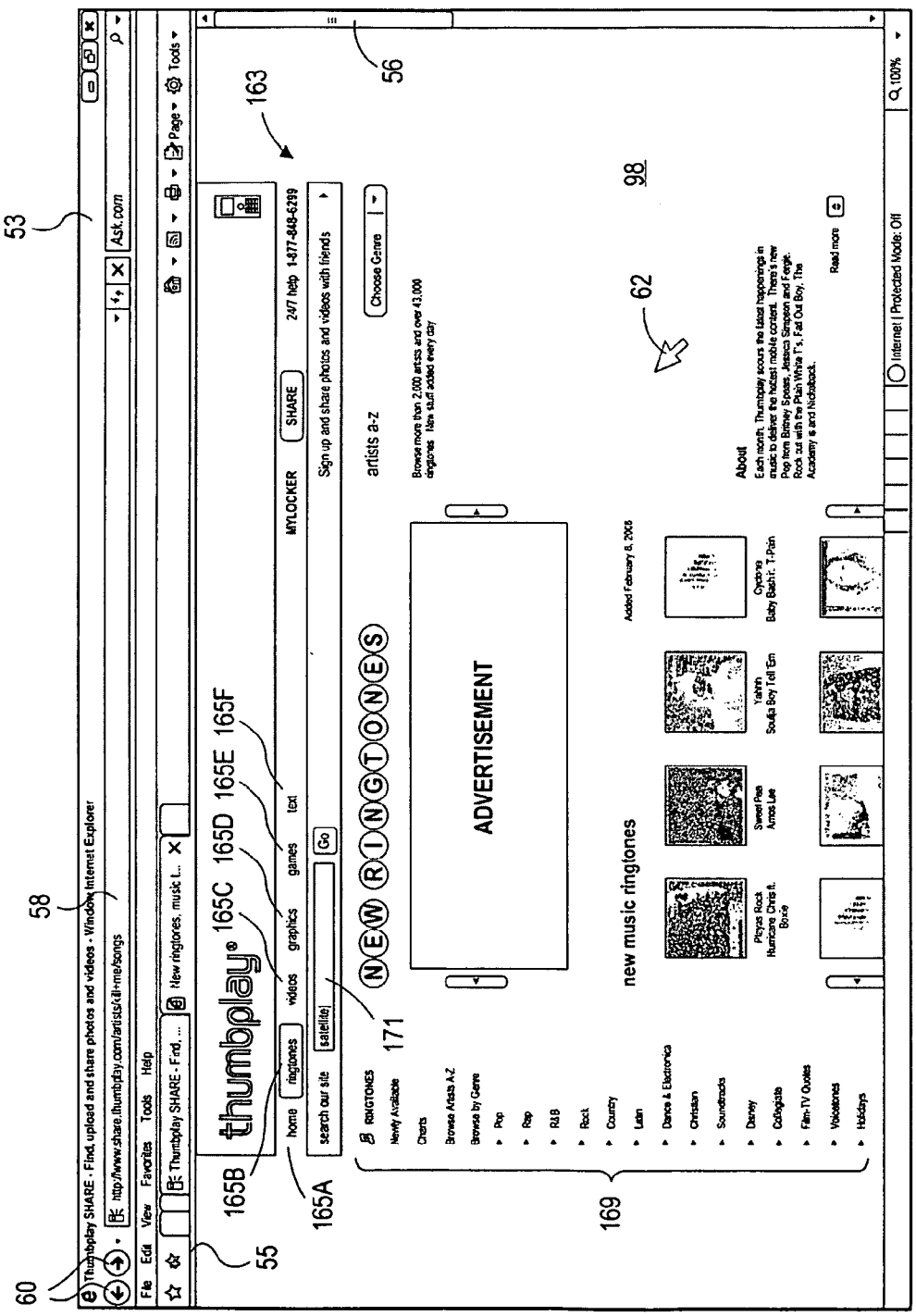
FIG. 2 is a screenshot of a browser view that displays a view of a website.

FIG. 2 illustrates a home page 163 within a browser view 53 at the user computer system 24, 26, or 28 in FIG. 1. The browser view 53 forms part of an Internet browser application such as Internet Explorer®, Netscape®, or Firefox®. The browser view 53 includes a viewing pane 55 within which the home page 163 is displayed. The browser view 53 also includes a vertical scroll bar 56 that can be moved up or down to view portions of the home page 163 if the entire home page 163 does not fit vertically within the viewing pane 55. The browser view 53 also has an address box 58 and back and forward buttons 60. A user can use a mouse to move a cursor 62 into the address box 58, and then depress a button on the mouse to select the address box 58. The user can then utilize a keyboard to enter text such as "http://www.thumbplay.com" in the address box 58, and can then depress an "enter" key on the keyboard to transmit a signal and a request for a page. The text within the address box 58 can also be automatically updated, for example when a user logs into the home page 163. The back and forward buttons 60 can be used to view earlier or subsequent pages.

The home page 163 is in a general area of the Web site 48 in FIG. 1. The home page 163 includes tabs 165A to 165F that provide links to other pages of the general area. In the home page 163, the tab 165B is highlighted, indicating that the home page 163 is in a portion of the general area relating to ringtones.

The home page 163 is typically displayed at one of the user computer systems 24, 26, or 28 in FIG. 1, and provides the user computer systems 24, 26, or 28 access to ringtones through a browse menu 169 or by entering text in a search box 171. Text can, for example, be entered in the search box 171, and an acquiring user can then either select a "go" button 172 or hit "enter" on a keyboard to cause transmission of a signal from the user computer systems 24, 26, or 28 over the internet 30 to the Web site 48 in FIG. 1. The signal includes an address for the Web site 48, a query that is entered in the search box 171, and a return address for the user computer systems 24, 26, or 28. The query is used at the Web site 48 to extract one or more search results. A signal is then transmitted from the Web site 48 over the internet 30 to the user computer systems 24, 26, or 28, the signal including the search result or search results and an address corresponding to the return address received from the user computer 24, 26, or 28.

Not every signal is described in detail herein. One skilled in the art will appreciate that a signal is generated by and transmitted from one computer system and received and processed at another computer system, and will also appreciate what the contents of such a signal will be. One skilled in the art will also appreciate that a computerized step is typically carried out by a respective module of software code stored in memory of a computer. For example, a transmission step is typically carried out by a transmission module, a receiving step is carried out by a receiving module, a password generation step is carried out by a password generation module, etc. These modules are connected to one another so that a step carried out by one module can be followed by a step carried out by another module.

Figure 3:
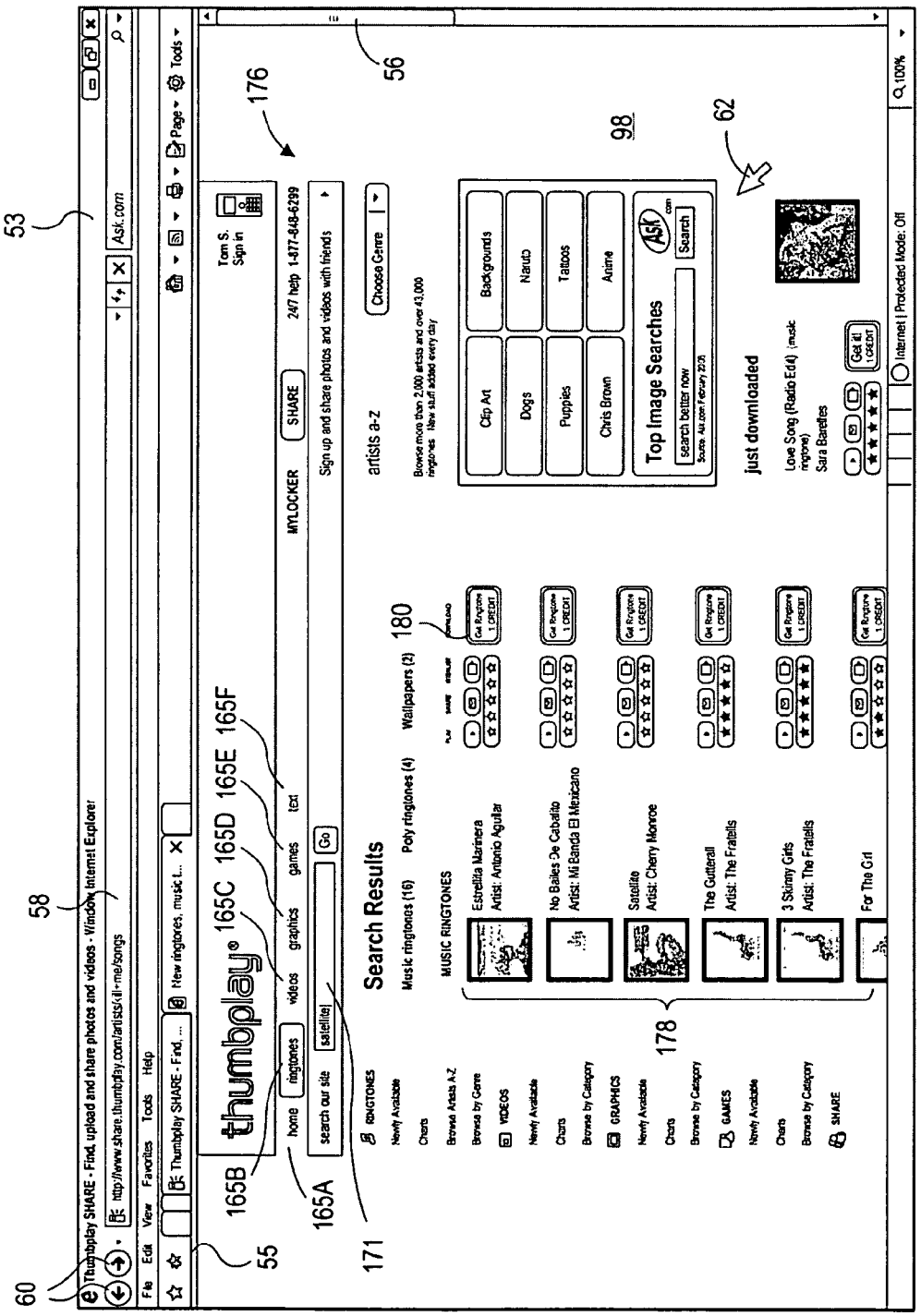
FIG. 3 is a view similar to FIG. 1, after a search has been conducted for media files in a database in FIG. 1.

FIG. 3 shows a view 176 that includes a download page with a plurality of search results 178 that are received at the user computer systems 24, 26, or 28 over the Internet 30 from the Web site 48. Each search result 178 includes a ringtone name, an artist name, and a ringtone download button 180, among other things.

Figure 4:
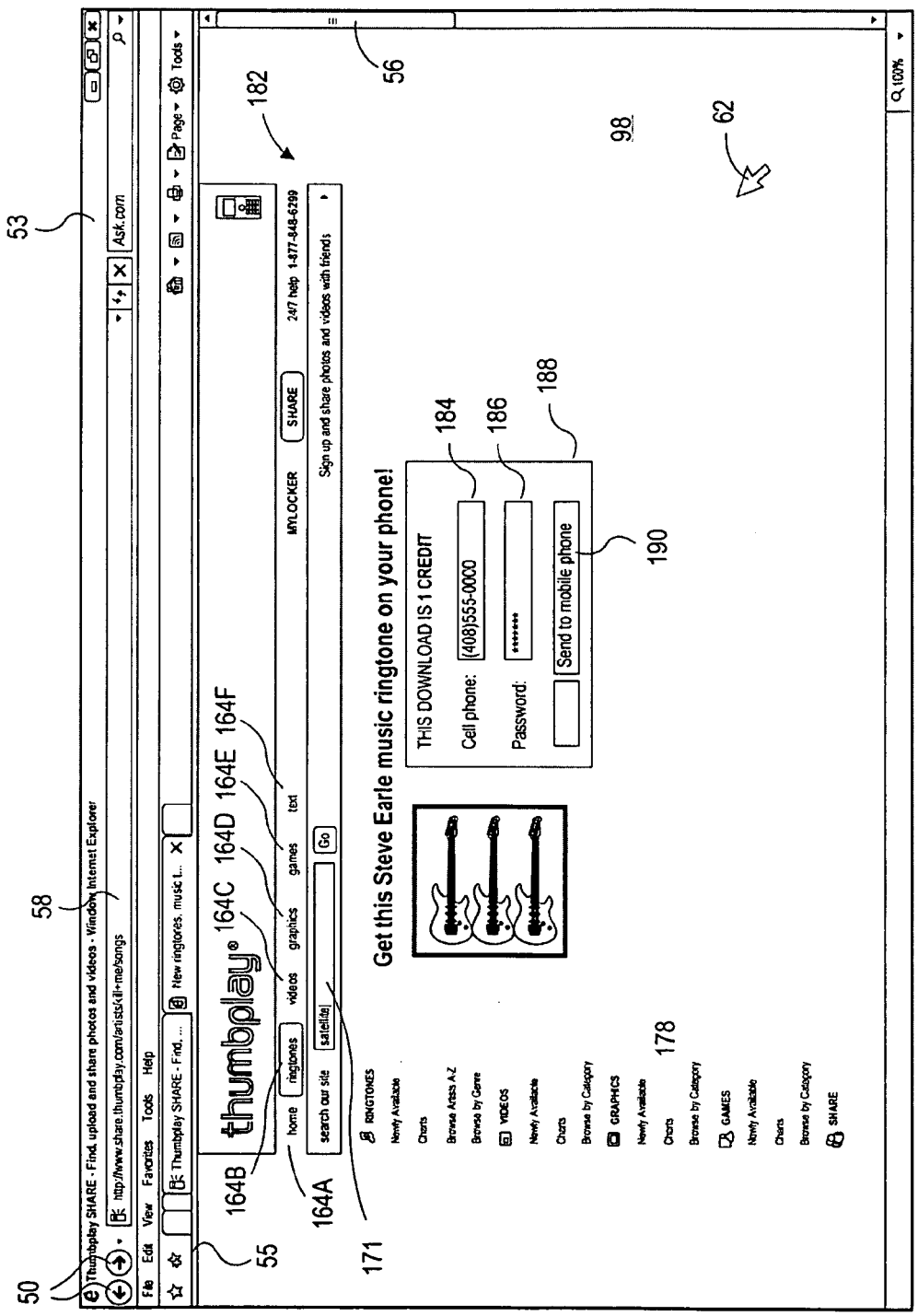
FIG. 4 is a view similar to FIG. 3, wherein registration and login information are completed and an instruction is sent to a server computer system to transmit a media file to a user mobile device.

FIG. 4 shows a view 182 that is displayed upon selection of one of the ringtone download buttons 180 in the view 176 of FIG. 3. A profile of the acquiring user computer system 24 is previously stored on the content delivery platform and content management system 46 of FIG. 1, including a mobile phone number 184 and a password 186. The view 182 includes the mobile phone number 184 and a password text box 188 for entering the password 186. The view 182 also has a "transmission" button 190. Upon selection of the "transmission" button 190, a signal is sent from the user computer system 24 over the Internet 30 to the Web site 48. The Web site 48 communicates with the content delivery platform and content management system 46, which uses the selected search result to access one of the ringtones on the media file server 42. The content delivery platform and content management system 46 then transmits a link corresponding to the accessed ringtone on the media file server 42 over the SMS/MMS network 40 to a user mobile device 32, 34, or 36 having the mobile phone number 184 in the view 182 of FIG. 4.

Figure 5:
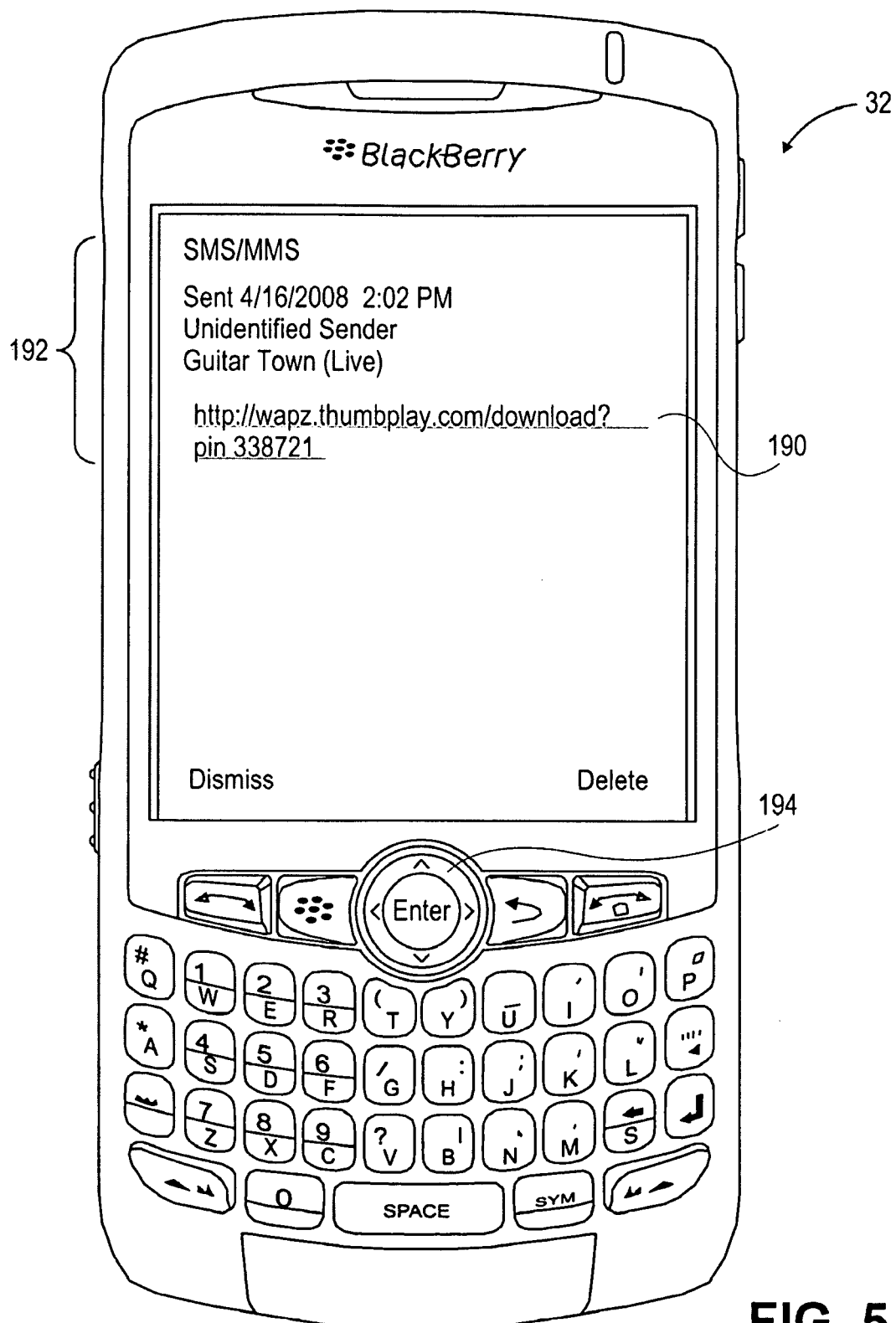
FIG. 5 is a front view of a user mobile device displaying an SMS message that is received by the user mobile device, the message including a link.

As shown in FIG. 5, the link 190 that is received at for example the user mobile device 32 comes in the form of an SMS message 192 that includes the link 190. An acquiring user can utilize "arrow" and "enter" keys 194 of the user mobile device 32 to select the link 190.

Figure 7:
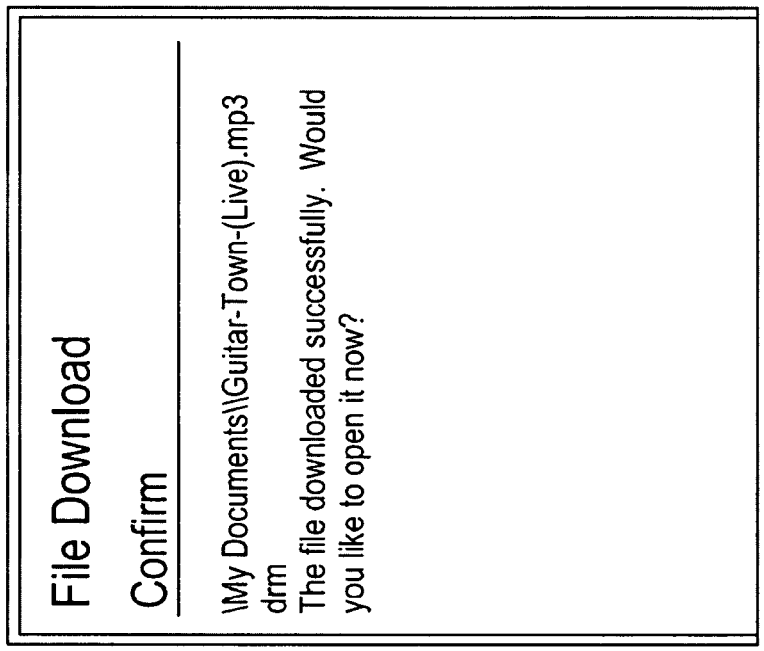
FIG. 7 is a view that is displayed on the user mobile device following successful downloading and saving of the media file.
Figure 6:
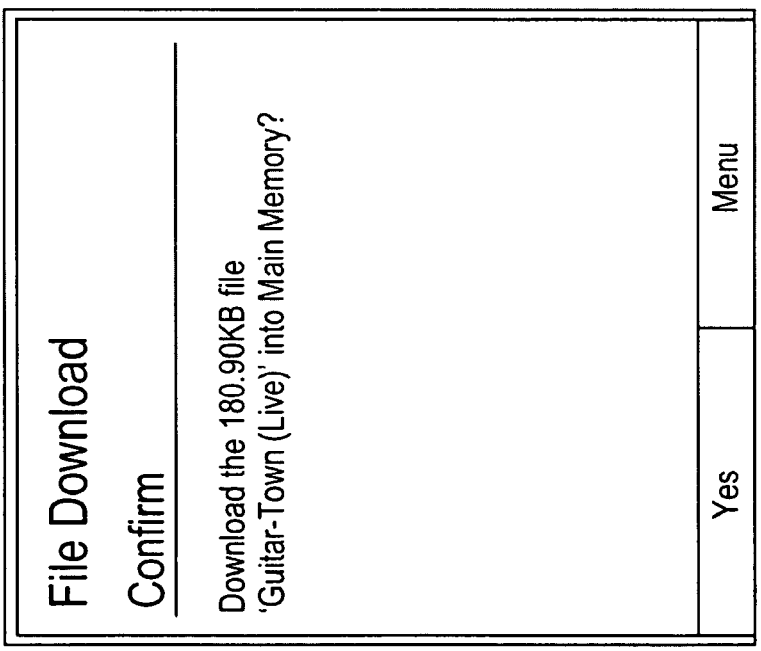
FIG. 6 displays a view on a WAP browser of the user mobile device to confirm downloading of a media file into memory of the user mobile device.

Upon selection of the link 190 and confirmation of the download as shown in FIG. 6, the user mobile device 32 transmits a requesting signal over the WAP network 38 in FIG. 1 to the content delivery platform and content management system 46. The content delivery platform and content management system 46 then automatically transmits a copy of the selected ringtone (or other media file) from the media file server 42 over the WAP network 38 to the respective user mobile device 32. The respective user mobile device 32 then automatically stores the copy of the selected ringtone in memory. As shown in FIG. 7, the user mobile device 32 then displays a message that confirms that the file has been downloaded and stored in memory of the user mobile device 32.

Figure 8:
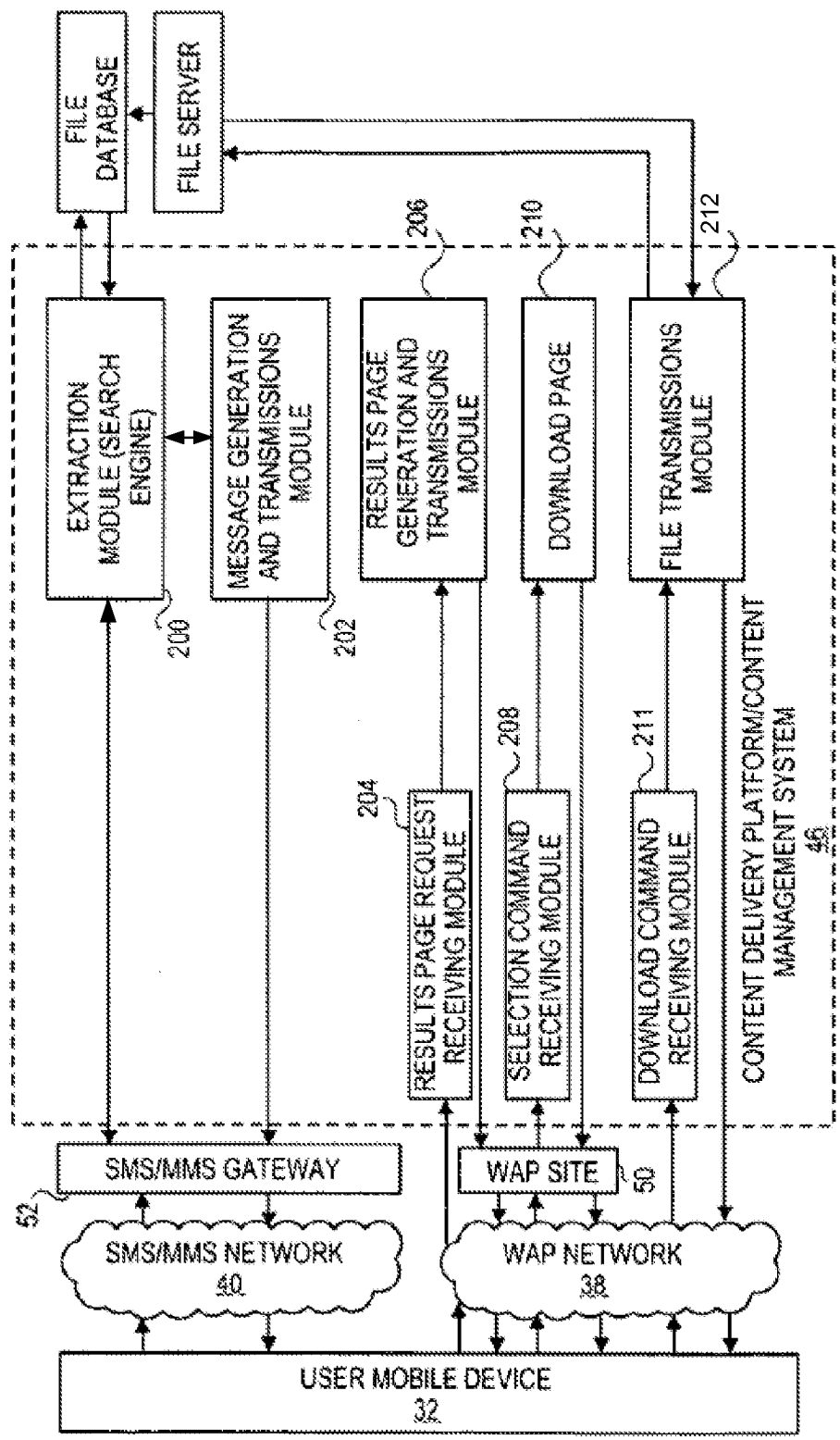
FIG. 8 is a block diagram illustrating components that are used primarily for processing a search request in a message from the user mobile device.

FIG. 8 illustrates components of the content delivery platform and content management system 46 that are used for responding to an SMS message with a search identifier "Get" that is received directly from for example the user mobile device 32 in FIG. 1. The components of the content delivery platform and content management system 46 shown in FIG. 8 provide a system that is different from and in addition to the system as hereinbefore described that utilizes the Website 48 in FIG. 1.

The content delivery platform and content management system 46 further includes a search engine, hereinafter referred to as an "extraction module" 200, a message generation and transmissions module 202, a results page request receiving module 204, a results page generation and transmissions module 206, a selection command receiving module 208, a download page 210, a download command receiving module 211 and a file transmissions module 212. The functioning of the system shown in FIG. 8 will now be described with reference to FIGS. 9 to 14 in conjunction with FIG. 8.

Figure 10:
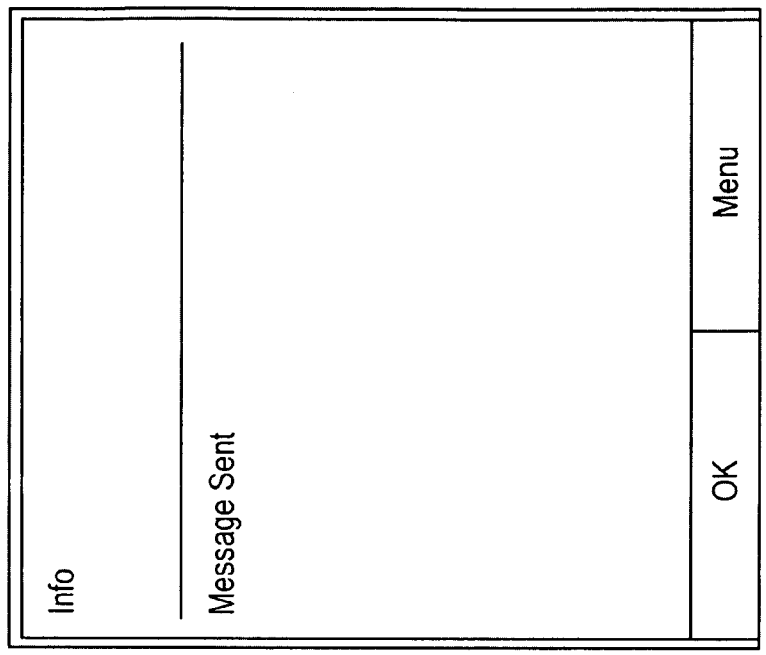
FIGS. 9 to 14 are views that are displayed on the user mobile device to illustrate the functioning of the system of FIG. 8.
Figure 9:
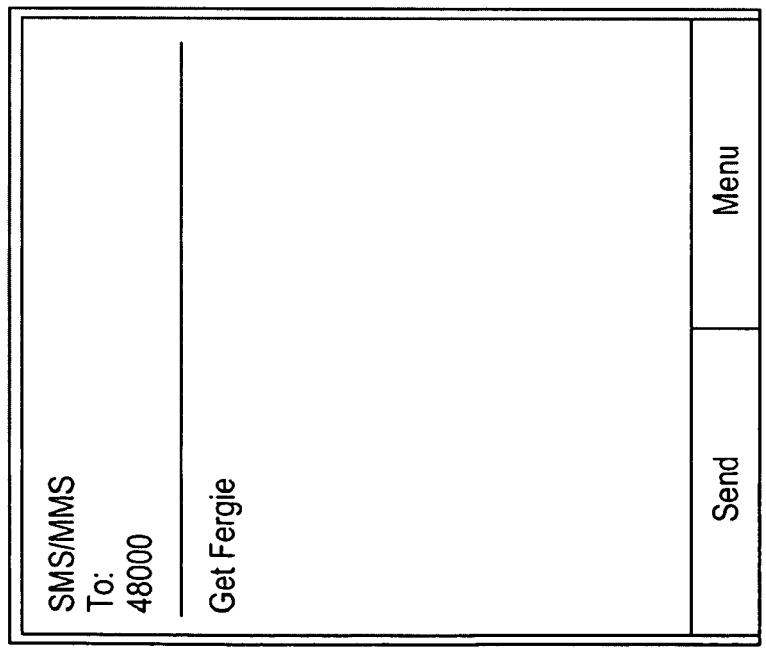

As shown in FIG. 9, the user of the user mobile device 32 prepares a message to an address 48000 with the text "Get Fergie" and then selects a "send" button to transmit the message. The message is transmitted from the user mobile device 32 over the SMS/MMS network 40 and is received by the SMS/MMS gateway 52. FIG. 10 shows a view that is displayed on the user mobile device 32 following transmission of the message.

SMS/MMS gateway 52 is connected to the extraction module 200. The extraction module 200 recognizes the text "Get" and the search query "Fergie" in the SMS message. The text "Get" serves as a search identifier. Upon detection of the search identifier "Get" by the extraction module 200, the extraction module 200 thus determines that the message includes a search identifier and then utilizes the search query "Fergie" to extract a plurality of search results from the file database 44.

Figure 11:
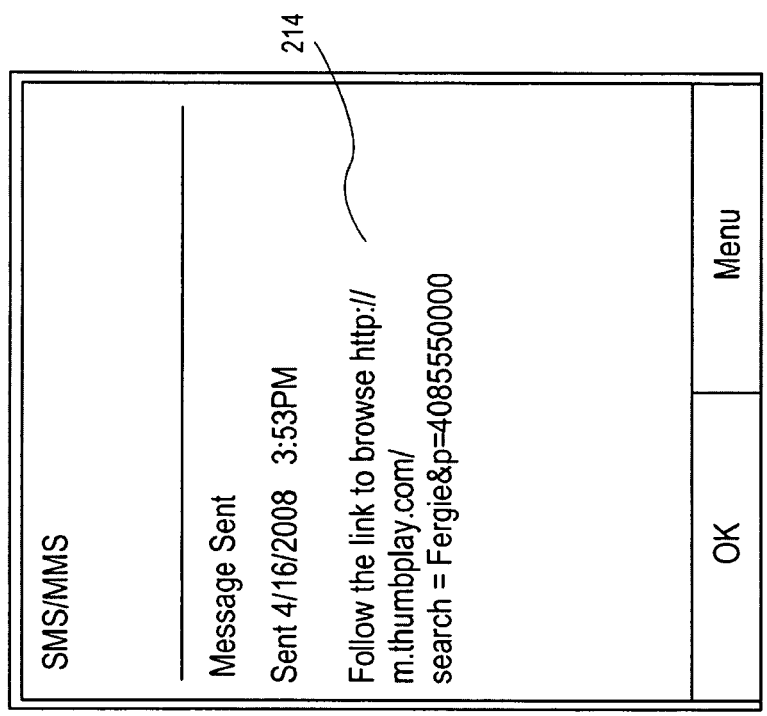

The message generation and transmissions module 202 is connected to the extraction module 200 and transmits a message through the SMS/MMS gateway 52 and the SMS/MMS network 40 to the user mobile device 32. If, as in the present example, the extraction module 200 has detected the search identifier "Get" in the SMS message of FIG. 9, the message that is transmitted by the message generation and transmissions module 202 as received by the user mobile device 32 and is shown in FIG. 11. The message includes a link 214 that can be selected by a user utilizing the "arrow" and "enter" keys of the user mobile device 32. If, on the other hand, the search identifier "Get" was not present in the text, a message is sent to the mobile user device 32 with text stating that the message from the user mobile device 32 was in error.

Figure 12B:
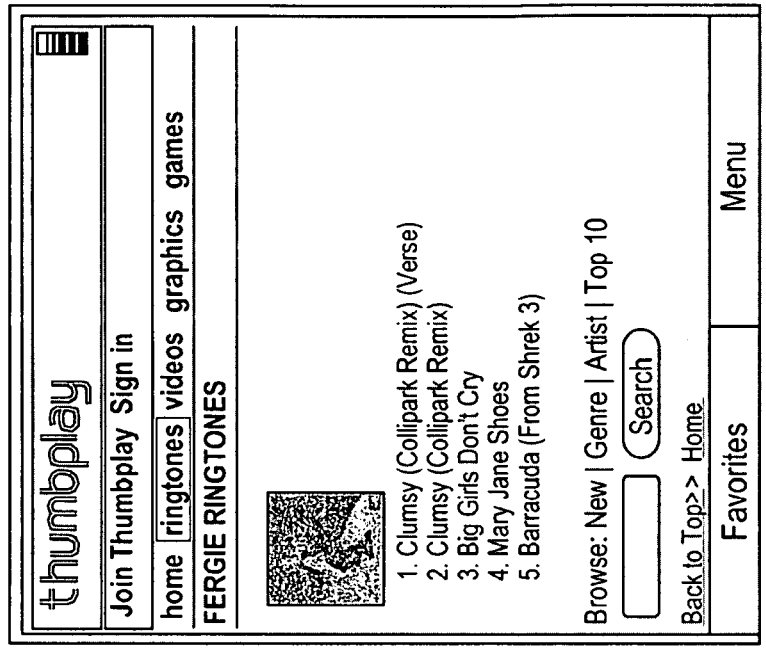
Figure 12A:
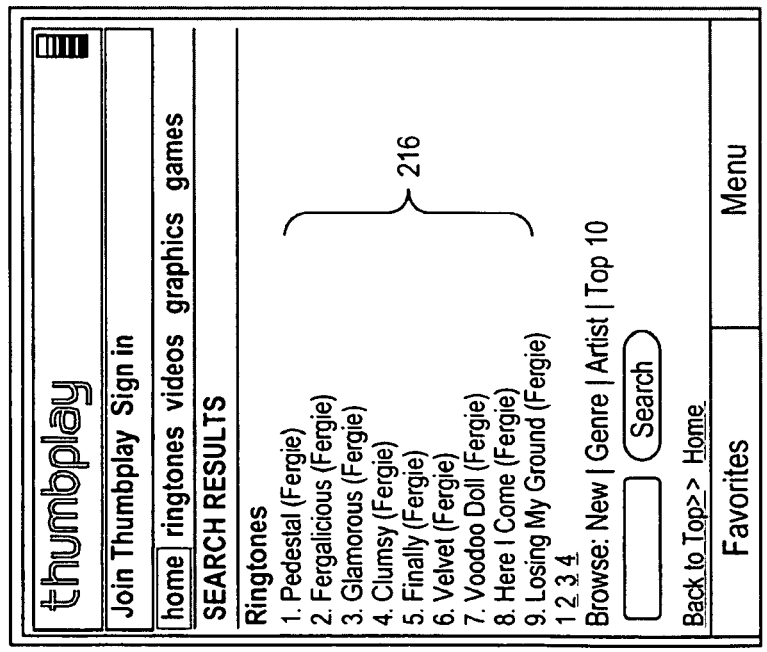

FIG. 12A shows a view of a WAP browser that automatically launches upon selection of the link 214 in FIG. 11. Upon selection of the link 214, a results page request command is transmitted by the user mobile device 32 over the WAP network 38 and is received by the results page request receiving module 204. The command includes the entire link 214. The link 214 includes the search request "Fergie" and a return address (the phone number) of the user mobile device 32. The results page generation and transmissions module 206 is connected to the results page request receiving module 204 and to the extraction module 200. The results page generation and transmissions module 206 generates a results page that includes the search results that are extracted by the extraction module 200 and transmits the results page via the WAP site 50 and the WAP network 38 to the user mobile device 32. FIG. 12A shows the results page and the search results 216 that are displayed by the WAP browser of the user mobile device 32.

FIG. 12B shows an alternative where a WAP browser is directed to an artist-specific page. An artist-specific page is displayed when a one-to-one match can be made between the search query and the artist-specific page. A track-specific page can be displayed when a one-to-one match can be made between the query and the track. A results page such as in FIG. 12A is displayed when a one-to-one relationship cannot be made between the query and either an artist or a track. The results page thus displays results from more than one artist or track.

Figure 13:
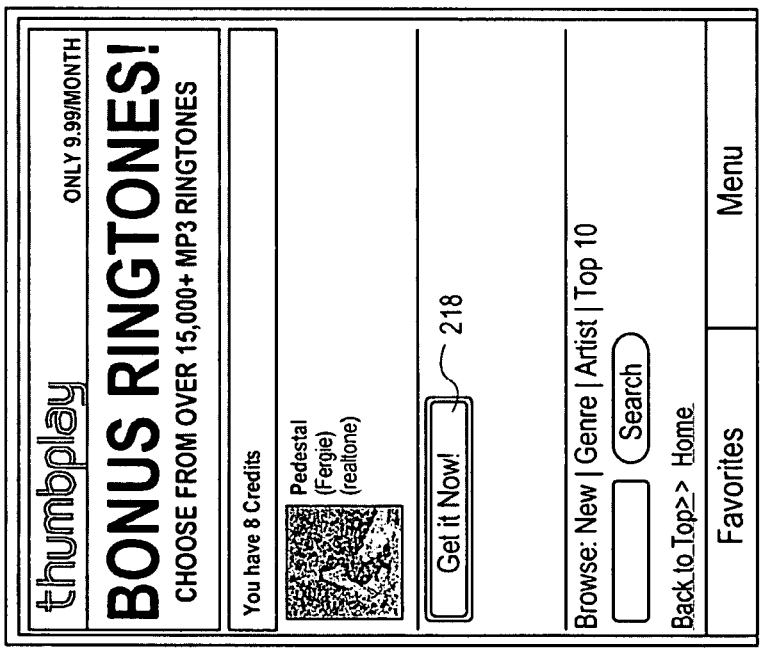

In the present example, the user selects the first search result "pedestal" to cause transmission of a selection command from the user mobile device 32 over the WAP network 38 and the WAP site 50. The selection command receiving module 208 is connected to the WAP site 50 and to the download page 210 so that the download page 210 is transmitted over the WAP site 50 and the WAP network 38 to the user mobile device 32. FIG. 13 shows a view of the download page 210 on the user mobile device 32. The download page 210 includes a "download" button 218. The buttons of the user mobile device 32 can be used to select the download button 218, which causes transmission of a download command from the user mobile device 32 over the WAP network 38.

Figure 14:
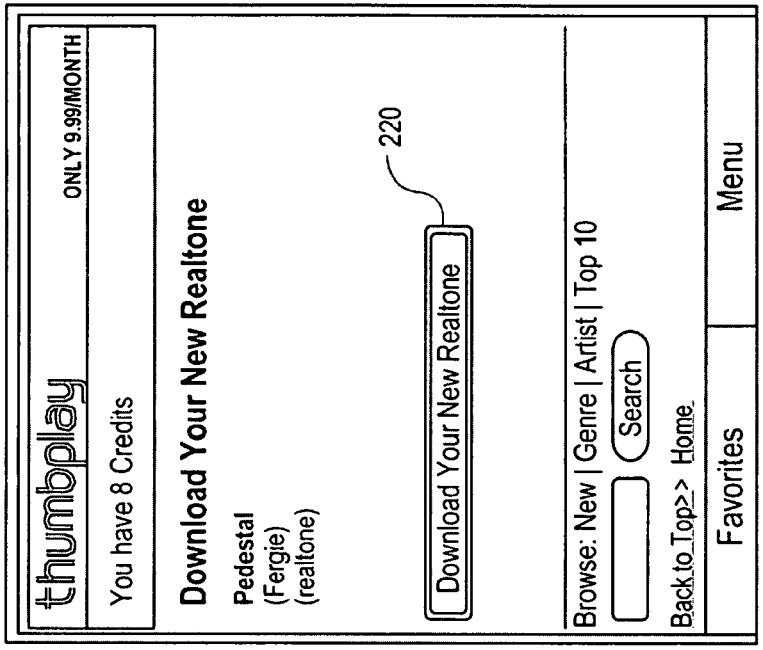

The download command receiving module 211 is connected to the WAP network 38 so as to receive the download command. The file transmissions module 212 is connected to the file server 42 and to the download command receiving module 211. The download command includes the name of the particular file in the file server 42, i.e. the file corresponding to the entry "pedestal" in the file database 44. The file transmissions module 212 utilizes the name of the entry in the download command to extract the corresponding file from the file server 42, and then transmits the file over the WAP network 38 to the user mobile device 32. FIG. 14 shows a view that is displayed on the user mobile device 32 to confirm downloading of the respective file. Upon selection of a confirmation button 220, the file is downloaded and saved in memory of the user mobile device 32 as hereinbefore describe with reference to FIGS. 6 and 7.

It can also been seen that the SMS messaging capabilities of the user mobile device 32 can be used to transmit a request for a media file. There is thus no need to utilize the WAP browser on the user mobile device 32 to search for and request a media file or to use a Web browser on a personal computer to search for and request a media file.

Figure 15:
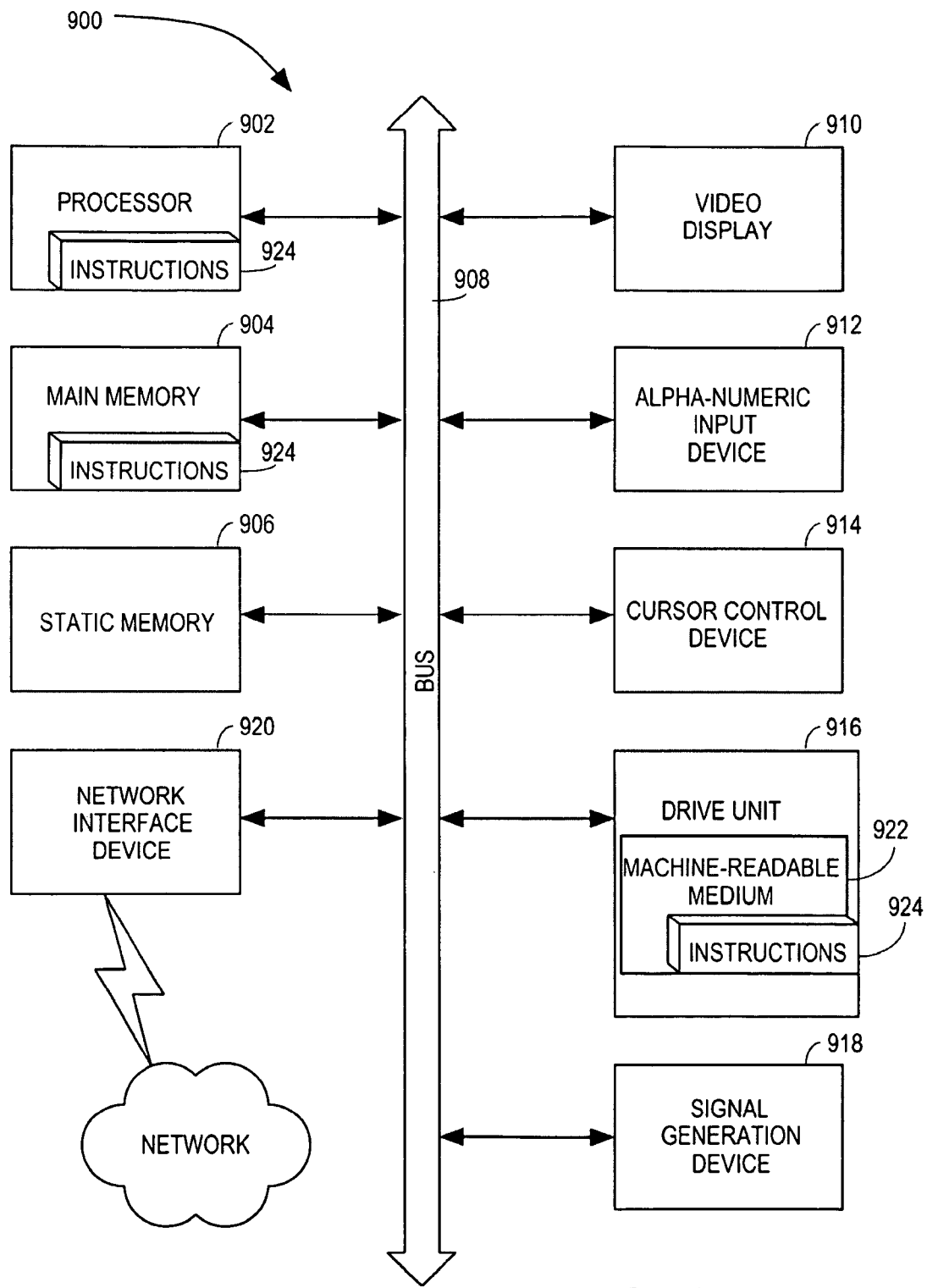
FIG. 15 is a block diagram of a machine in the form of a computer system that can be used as a computer or a mobile device in the systems of FIG. 1 or 8.

FIG. 15 shows a diagrammatic representation of a machine in the exemplary form of a computer system 900 within which a set of instructions, for causing the machine to perform any one or more of the methodologies discussed herein, may be executed, In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908.

The computer system 900 may further include a video display 910 (e.g., a liquid crystal display (LCD) or a cathode ray tube (CRT)). The computer system 900 also includes an alpha-numeric input device 912 (e.g., a keyboard), a cursor control device 914 (e.g., a mouse), a disk drive unit 916, a signal generation device 918 (e.g., a speaker), and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

While the machine-readable medium 924 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A computer-based method of transmitting data, comprising:
    receiving a message from a user mobile device at a server computer system;
    determining at the server computer system whether the message from the user mobile device includes a search identifier, the search identifier indicating, by its presence, that a search is to be performed;
    in response to a determination that the message from the user mobile device includes a search identifier:
        searching a data store at the server computer system to identify a search result based on a search term in the message from the user mobile device, wherein the message from the user mobile device includes text, a first part of the text being the search identifier and a second part of the text being the search term,
        transmitting a message from the server computer system to the user mobile device, the message from the server computer system including a link for downloading a file corresponding to the search result,
        receiving a download command from the user mobile device at the server computer system at least in part due to receiving a user's selection of the link, and
        transmitting the file corresponding to the search result from the server computer system to the user mobile device in response to receiving the download command; and
    in response to determining that the message from the user mobile device does not include the search identifier, transmitting an error message to the user mobile device.

2. The method of claim 1, wherein the message from the server computer system is an SMS message.

3. The method of claim 1, further comprising:
    transmitting results data, the results data including at least one search result, from the server computer system to the mobile device in response to receiving the user's selection of the link.

4. The method of claim 3, wherein a plurality of search results are included in the results data each search result being individually selectable by the user.

5. The method of claim 3, further comprising:
    receiving a selection command from the user mobile device at the server computer system due to receiving the user's selection of one of the search results; and
    transmitting a download page from the server computer system to the user mobile device in response to receiving the selection command, the download page including a download selector that is selectable to transmit the download command.

6. A non-transitory computer-readable medium having stored thereon a set of instructions that are executable by a processor of a computer to carry out a computer-based method of transmitting a file, the method comprising:
    receiving a search message from a user mobile device at a server computer system;
    determining at the server computer system whether the search message includes a search identifier;
    in response to determining that the search message includes a search identifier:
        extracting at least one search result from a data store at the server computer system based on a search term in the search message, wherein the search message includes text, a first part of the text being the search identifier and a second part of the text being the search term,
        receiving a selection command from the user mobile device at the server computer system including a selection of one of the at least one search result, and
        transmitting a download page from the server computer system to the user mobile device in response to receiving the selection command, the download page including a download selector that is selectable to transmit the download command; and
    in response to determining that the search message does not include a search identifier, transmitting an error message to the user mobile device.

7. The non-transitory computer-readable medium of claim 6, the computer-based method of transmitting a file further comprising:
    transmitting a search result link message from the server computer system to the user mobile device if the search message includes a search identifier, the search result link message including a link for downloading search results.

8. The non-transitory computer-readable medium of claim 7, the computer-based method of transmitting a file further comprising:
receiving a results request at the server computer system in response to transmitting the search request link; and
transmitting the search results to the user mobile device in response to receiving the results request.

9. The non-transitory computer-readable medium of claim 8, the computer-based method of transmitting a file further comprising:
receiving the selection command at the server computer system in response to transmitting the search results.

10. The non-transitory computer-readable medium of claim 9, the computer-based method of transmitting a file further comprising:
receiving a download command at the server computer system in response to transmitting the download page; and
transmitting a file to the user mobile device in response to receiving the download command.

11. The non-transitory computer-readable medium of claim 6, the computer-based method of transmitting a file comprising further comprising:
in response to determining that the search message includes a search identifier, transmitting a tile corresponding to the search result from the server computer system to the user mobile device.

12. A server computer system comprising:
an extraction module to receive a search message from a user mobile device, the extraction module to determine whether the search message includes a search identifier;
at least one store holding a plurality of files and a plurality of entries corresponding to the files, the extraction module connected to the at least one store, the extraction module to extract at least one search term in the search message in response to a determination that the search message includes a search identifier, the search identifier indicating, by its presence, that a search is to be performed, wherein the search message includes text, a first part of the text being the search identifier and a second part of the text being the search term;
a message generation and transmission module coupled to the extraction module, the message generation and transmission module to transmit an error message to the user mobile device in response to a determination that the search message does not include the search identifier; and
a file transmissions module coupled to the store, the file transmission module to:
transmit a message from the server computer system to the user mobile device in response to the determination that the search message includes the search identifier, the message from the server computer system includes a link for downloading a file corresponding to the search result,
receive a download command from the user mobile device at the server computer system at least in part due to receiving the user's selection of the link, the file being transmitted in response to receiving the download command, and
transmit the file corresponding to the search result from the server computer system to the user mobile device in response to receiving the download command.

13. The server computer system of claim 12, further comprising:
a results page generation and transmissions module to generate and transmit a results page based on the at least one term extracted from the extraction module.

14. The server computer system of claim 13, further comprising:
wherein the extraction module extracts a plurality of search results based on the search term; and
wherein the plurality of search results are included in the results page.

* * * * *